United States Patent
Shi et al.

(10) Patent No.: US 10,875,286 B2
(45) Date of Patent: Dec. 29, 2020

(54) MULTILAYER SHRINK FILM WITH SCISSION LAYER

(71) Applicant: CLYSAR LLC, Clinton, IA (US)

(72) Inventors: Guangda Shi, Clinton, IA (US); Kurt Bormann, Clinton, IA (US)

(73) Assignee: Clysar LLC, Clinton, IA (US)

( * ) Notice: Subject to any disclaimer, the term of this patent is extended or adjusted under 35 U.S.C. 154(b) by 492 days.

(21) Appl. No.: 15/086,190

(22) Filed: Mar. 31, 2016

(65) Prior Publication Data

US 2016/0288475 A1  Oct. 6, 2016

Related U.S. Application Data

(60) Provisional application No. 62/142,305, filed on Apr. 2, 2015.

(51) Int. Cl.
*B32B 37/14* (2006.01)
*B32B 27/16* (2006.01)
(Continued)

(52) U.S. Cl.
CPC ............ *B32B 37/144* (2013.01); *B32B 27/06* (2013.01); *B32B 27/08* (2013.01); *B32B 27/16* (2013.01);
(Continued)

(58) Field of Classification Search
CPC ..... B32B 37/144; B32B 27/304; B32B 27/34; B32B 27/322; B32B 27/32; B32B 27/306;
(Continued)

(56) References Cited

U.S. PATENT DOCUMENTS

| 4,188,443 A | 2/1980 | Mueller et al. |
|---|---|---|
| 4,229,241 A | 10/1980 | Mueller |

(Continued)

FOREIGN PATENT DOCUMENTS

| EP | 0333294 | 9/1989 |
|---|---|---|
| EP | 0816069 | 1/1998 |

(Continued)

OTHER PUBLICATIONS

Yoshiga et al., "Controlled Degradation and Crosslinkiing of Polypropylene Induced by Gamma Radiation and Acetylene" (Polym. Bull. (2009) 63:397-409.*

(Continued)

*Primary Examiner* — Christopher T Schatz
*Assistant Examiner* — Cynthia L Schaller
(74) *Attorney, Agent, or Firm* — Dorsey & Whitney LLP

(57) ABSTRACT

Various embodiments of multilayer polymer films and multilayer structures with enhanced tear strength are provided. Also disclosed are processes and systems for producing the disclosed multilayer polymer films. The disclosed films comprise a first polymer that may be cross-linkable upon exposure to radiation, and a second polymer that is cleaved or broken when exposed to irradiation. Layers comprising the first polymer are referred to as bulk layers, and layers comprising the second polymer are referred to as scission layers. Scission layers are positioned between bulk layers. The bulk and scission layers may comprise one or more sublayers.

12 Claims, 3 Drawing Sheets

(51) Int. Cl.
*B32B 27/32* (2006.01)
*B32B 27/08* (2006.01)
*B32B 27/30* (2006.01)
*B32B 27/34* (2006.01)
*B32B 27/06* (2006.01)
*B32B 37/06* (2006.01)

(52) U.S. Cl.
CPC .......... *B32B 27/304* (2013.01); *B32B 27/306* (2013.01); *B32B 27/32* (2013.01); *B32B 27/322* (2013.01); *B32B 27/34* (2013.01); *B32B 37/06* (2013.01); *B32B 2250/24* (2013.01); *B32B 2250/40* (2013.01); *B32B 2307/582* (2013.01); *B32B 2307/5825* (2013.01); *B32B 2307/736* (2013.01); *B32B 2323/04* (2013.01); *B32B 2327/06* (2013.01); *B32B 2327/18* (2013.01); *B32B 2553/00* (2013.01)

(58) Field of Classification Search
CPC ......... B32B 27/06; B32B 27/16; B32B 27/08; B32B 37/06; B32B 2307/5825; B32B 2250/40; B32B 2327/18; B32B 2327/06; B32B 2323/04; B32B 2307/582; B32B 2250/24; B32B 2553/00; B32B 2307/736
See application file for complete search history.

(56) References Cited

U.S. PATENT DOCUMENTS

| | | | |
|---|---|---|---|
| 4,619,859 A * | 10/1986 | Yoshimura | B32B 27/32 428/213 |
| 4,755,419 A | 7/1988 | Shah | |
| 4,892,603 A | 1/1990 | Lustig et al. | |
| 5,063,005 A | 11/1991 | Doheny, Jr. | |
| 5,270,390 A | 12/1993 | Shibuya et al. | |
| 5,300,353 A * | 4/1994 | Yoshimura | B32B 27/08 428/213 |
| 5,604,043 A | 2/1997 | Ahlgren | |
| 5,756,219 A * | 5/1998 | Miro | B32B 27/32 428/516 |
| 5,916,929 A * | 6/1999 | Knobel | C08J 3/28 522/150 |
| 6,051,292 A | 4/2000 | Lind et al. | |
| 7,063,882 B2 | 6/2006 | Mossbrook et al. | |
| 7,261,944 B2 | 8/2007 | Kliesch et al. | |
| 7,473,473 B2 | 1/2009 | Verrocchi | |
| 8,012,572 B2 | 9/2011 | Ramli et al. | |
| 8,080,310 B2 | 12/2011 | Ramli et al. | |
| 8,241,736 B2 | 8/2012 | Ramli et al. | |
| 8,562,885 B2 | 10/2013 | Dooley et al. | |
| 2002/0006482 A1 | 1/2002 | Falla et al. | |
| 2004/0013896 A1 | 1/2004 | Ferri et al. | |
| 2006/0093810 A1 | 5/2006 | Blake et al. | |
| 2006/0272767 A1 | 12/2006 | Kreitman et al. | |
| 2008/0274245 A1 * | 11/2008 | Lee | B32B 7/12 426/394 |
| 2010/0227136 A1 | 9/2010 | Ramli et al. | |
| 2012/0028017 A1 * | 2/2012 | Saraf | B32B 27/32 428/218 |
| 2014/0191375 A1 | 7/2014 | Hartley et al. | |
| 2018/0001609 A1 * | 1/2018 | Rivett | B32B 27/08 |

FOREIGN PATENT DOCUMENTS

| | | |
|---|---|---|
| EP | 1603733 | 12/2005 |
| EP | 2052857 | 4/2009 |
| WO | 2006060766 | 6/2006 |
| WO | 2014111548 | 7/2014 |

OTHER PUBLICATIONS

International Search Report and Written Opinion for International Application No. PCT/US2016/025112 dated Jul. 14, 2016, 11 pages.
International Preliminary Report on Patentability regarding Application No. PCT/US2016/025112, dated Oct. 3, 2017, 6 pages.

* cited by examiner

MULTILAYER SHRINK FILM WITH SCISSION LAYER

CROSS-REFERENCE TO RELATED APPLICATION(S)

This application benefit of U.S. Provisional Application No. 62/142,305 filed Apr. 2, 2015, the contents of which are incorporated herein by reference.

FIELD

The disclosed processes, methods, and systems are directed to shrinkable multilayer polymeric films.

BACKGROUND

One goal in the film industry is to create films that possess increased tear resistance, without increasing film thickness. One method of increasing tear resistance of a film is to subject the film to irradiation. Irradiation may result in crosslinking polymer molecules within the film, for example polyethylene (PE). Crosslinking may create bonds within a polymer or between two polymers. Where irradiation creates a bond between two different polymer molecules, the result may be an increase in the average length and/or molecular weight of the polymer.

Irradiation of films may also have the opposite effect. Not all polymers subjected to irradiation will result in cross-linking. In some cases, irradiation of the polymer may cause the polymer molecule to be cleaved or broken. This may be referred to as "scission." Scission will result in the polymer molecules in the layer decreasing in average molecular weight and/or length.

In addition to irradiation, other methods are available for increasing tear resistance of a film. In some cases, increasing the number of polymer layers within the film may help to create a more tear resistant film. In some cases, multilayer films with core layers comprising 25 or more sub-layers have been created. The increased tear resistance is the result of an increased number of layer interfaces between adjacent sublayers. The sublayer interfaces help absorb energy during tearing and resist tear crack propagation.

Heat-shrinkable films shrink or contract upon exposure to elevated temperatures. This allows the films to be used to enclose or shrink around a product to produce a close film wrapping that conforms to the contours of the product. Where the shrinkable film is restrained from shrinking around the product, a tension within the film may be generated.

Shrink films are generally manufactured by extrusion (single layer films) or coextrusion (multi-layer films) of polymer materials. The polymers are first heated to their flow or melting point and extruded from a die (either tubular (round) or planer (sheet)). After extrusion the film is cooled and then reheated and stretched to orient or align the crystallites and/or molecules within the film material. The reheating temperature orientation temperature range for a given material or materials will vary with the different resinous polymers and/or blends thereof that make up the material. However, the orientation temperature range for a given thermoplastic material may generally be stated to be below the crystalline melting point of the material but above the second order transition temperature (sometimes referred to as the glass transition point) thereof. Within this temperature range, a film may effectively be oriented.

SUMMARY

Disclosed herein is a multilayer, heat-shrinkable film, with two or more bulk layers that include one or more cross-linkable polymers, and one or more scission layers positioned between the bulk layers, wherein the scission layer includes a polymer that is cleaved when exposed to irradiation. In some embodiments, the scission layer may have a thickness less than about 10%, preferably less than about 5%, of the total thickness of the multilayer film, and the film may have a thickness ranging from about 0.3 to about 4.0 mil, for example about 0.4, about 0.6, or about 0.75 mil. The cross-linkable polymer of the disclosed film may be selected from one or more of ethylene/alpha-olefin copolymer, ethylene/vinyl acetate copolymer, polyamide, polyacrylate, polyvinyl chloride, chlorinated polyethylene, and the scission layer polymer may be selected from one or more of polypropylene homopolymer or copolymer, polytetrafluoroethylene, polyacetals, and polymethylpentene. The scission layer positioned between a first bulk layer and a second bulk layer may be between about 0.2% and about 10%, preferably about 0.2% and about 5% of the total thickness of the multilayer film, for example about 2%. The bulk layer of the multilayer film may comprise a polymer selected from one or more of high density polyethylene, linear low density polyethylene, medium density polyethylene, and low density polyethylene.

The tear resistance of the disclosed multilayer film is enhanced by irradiation, such that a multilayer film of about 0.75 mil has a tear value, as measured by the method of ASTM D1922, of at least about 10, about 20, about 30, or about 40 grams, as measured in machine or transverse direction. In most cases, the multilayer film is irradiated by exposure to electron beam irradiation at greater than about 1.0 Mrd, about 2.5 Mrd, about 3.0 Mrd, or about 4.0 Mrd.

Methods of enhancing tear strength of a multilayer film are also disclosed. In one embodiment, the method includes creating a film that includes at least two bulk layers, and at least one scission layer positioned between two bulk layers, wherein the bulk layers comprise a first polymer composition and the scission layer comprises a second polymer composition; and exposing the film to a radiation source, wherein the second polymer composition comprises a polymer selected from one or more of polypropylene homopolymer or copolymer, polytetrafluoroethylene, polyacetals, and polymethylpentene, and the radiation source is an electron beam, and the film is exposed to about 1.5 to about 4.0 Mrds of eBeam radiation.

Methods of using a multilayer heat shrink-able film are also disclosed. The methods include wrapping a product with the multilayer heat shrinkable film, wherein the film includes at least one scission layer that has been exposed to irradiation; exposing the wrapped product to heat; and allowing the film to shrink around the product.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

BRIEF DESCRIPTION OF THE DRAWINGS

FIG. 1A is a 3-layer film and FIG. 2B is a 7-layer film.

FIGS. 2A-2B are graphs showing tear strength of one embodiment of the disclosed film prior to (FIG. 2A) and after irradiation (FIG. 2B).

DETAILED DESCRIPTION

Disclosed herein are multilayer polymer films with enhanced tear resistance and methods, processes, and systems for producing and using multilayer polymer films. The disclosed films comprise a first layer and a second layer, the layers comprising one or more polymers that are sensitive to irradiation. In many cases the polymer of the first layer may respond to irradiation by increasing the number of crosslinks between polymer chains. However, the second layer is comprised of at least one polymer that is at least partially degraded, cleaved, or broken as a result of exposure to irradiation. This second layer may be referred to as a "scission layer." In some embodiments, the scission layer is positioned between at least two other layers comprising the first polymer, which as discussed above may increase in crosslinking upon irradiation. Layers comprising the first polymer may be referred to as "bulk layers," and represented by the letter "B", and the scission layers represented by the letter "s". Bulk, B, and scission, s, layers may be comprised of one layer, or two or more sublayers. For example, a scission layer, with two sublayers, may be positioned between two bulk layers, represented as B/s/s/B.

In many cases, the disclosed multilayer shrink film does not require a large number of scission-layers positioned between the bulk layers to have increased tear resistance. Rather, the disclosed multilayer shrink film possesses enhanced tear strength because irradiation acts to cleave polymer molecules within the scission layer and crosslink polymers within the bulk layer. These results help to improve the energy absorption capacity of the film. Thus, when a tear is initiated and then propagated through the multilayer shrink film, the tear now has a much longer path to travel due to a weakened bulk/scission interface(s).

One embodiment of the disclosed multilayer shrink film comprises two bulk layers with at least one scission layer positioned between the bulk layers; e.g. B/s/B. In some embodiments, there may be more than two bulk layers and more than one scission layer.

Figure 1A:
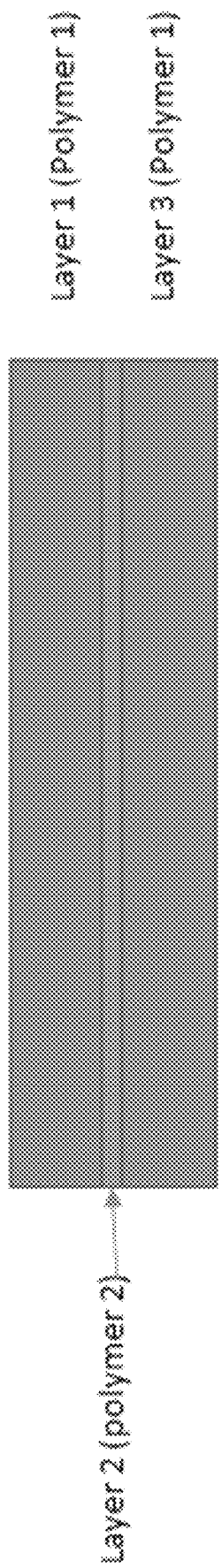
FIGS. 1A-1B depict two embodiments of the disclosed multilayer shrink film.
Figure 1B:
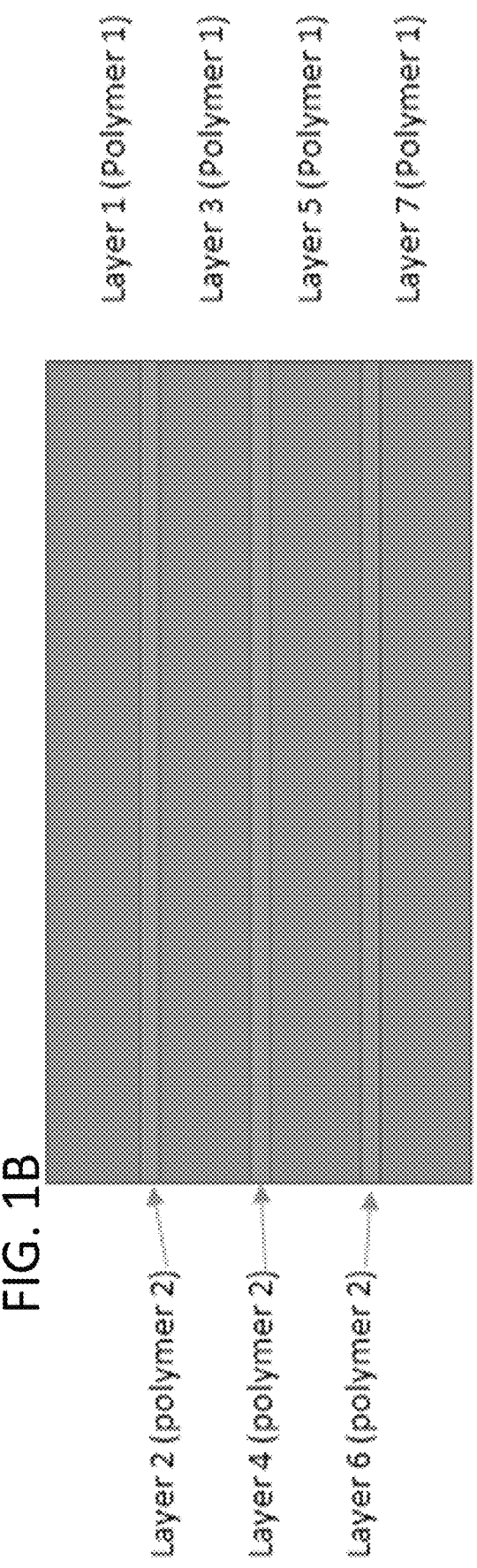

FIG. 1 shows two exemplary embodiments of the disclosed multilayer shrink film. The multilayer films comprise two types of polymer: polymer 1 (Layers 1 & 3 of FIG. 1A, and Layers 1, 3, 5, and 7 of FIG. 1B), and polymer 2 (Layer 2 of FIG. 1A, and Layers 2, 4 and 6 of FIG. 1B). Polymer 1 may result in cross-linked polymers when irradiated, and Polymer 2 may result in cleaved or broken polymers when irradiated. FIG. 1A shows a 3-layer film structure in which the surface, or bulk, layers (Layer 1 & 3) are comprised of at least one crosslinkable polymer (polymer 1), and the scission layer (Layer 2) comprises at least one polymer that degrades upon irradiation. The structure of the film of FIG. 1A is depicted as B/s/B. FIG. 1B shows a multilayer film with 4 bulk layers (layers 1, 3, 5, 7) comprising at least one crosslinkable polymer (polymer 1), and 3 scission layers (layers 2, 4, 6) comprising at least 1 polymer that degrades upon irradiation. The structure of the multilayer film of FIG. 1B is depicted as B/s/B/s/B/s/B.

The thickness of the multilayer shrink film may vary depending upon the intended use of the film. In some embodiments, the disclosed multilayer shrink film may be from about 0.3 mil to about 4.0 mil. In most embodiments, the multilayer shrink film is about 0.4 mil to about 1.0 mil. In some embodiments, the multilayer shrink film may be about 0.6 mil or about 0.75 mil.

The thickness of an individual scission layer may vary. In most embodiments, the thickness of the scission layer or layers is less than about 20% of the total thickness of the multilayer film. In many embodiments, each scission layer has a thickness that is less than about 5% of the total thickness of the multilayer film. In one embodiment, the individual scission layers are between about 0.2% and about 3.0% of the total thickness of the multilayer film, for example about 2%.

The thickness of an individual bulk layer can vary. In most embodiments, the bulk layers of the disclosed multilayer film have the same or similar thicknesses, which may aid in reducing curling or warping of the multilayer film. In many embodiments, the bulk layers comprise between about 80% and about 99.8% of the total thickness of the multilayer shrink film. In many embodiments, a thickness ratio between bulk layer and scission layer is between about 2:1 (B:s, e.g. where the scission layer is about 20% of the total thickness) and about 250:1 (e.g. where the scission layer is about 0.2% of the total thickness) and preferable between about 5:1 and about 30:1 and more preferable between about 10:1 and about 20:1.

Polymers for Use in Shrink Film

The disclosed multilayer films include layers made from a first polymeric composition and a second polymeric composition. In most cases, the first polymeric composition is comprised of at least one polymer that increases in average molecular weight when exposed to irradiation, while the second polymeric composition is comprised of at least 1 polymer that decreases in average molecular weight upon exposure to irradiation. A layer comprising the first polymeric composition may be referred to as a "bulk layer," and a layer comprising the second polymeric composition may be referred to as a "scission layer."

Various polymers may be used in the multilayer shrink films. In most cases, the type of polymer may depend on the multilayer product and its intended application and/or physical characteristics. For example, polyethylene may be selected where shrink films are to be used in display applications, such as display of several bundled items (e.g. a gift basket or several small cereal boxes etc.). Alternatively, a polypropylene-based film may be selected where high production speed is desired (e.g. rapidly packaging many single items). Some characteristics that may be varied by selection of polymer are: toughness, shrink force, stiffness, barrier, etc.

Polymers and co-polymers disclosed herein may include various additives. In some cases additives may be added during the extrusion process. In some embodiments, the additives may be colorant, anti-stats, nanoparticles, nanoparticle clay, anti-fog, filler, talc, starch, $CaCO_3$, slip and/or anti-block. The additives may be incorporated into the resin, or may be incorporated during extrusion. In some embodiments, additives may aid in modifying a barrier layer, for example to decrease oxygen transfer. In some embodiments, additives, for example slip and/or anti-block, may aid in controlling friction and/or adhesion of a film surface. In some cases, slip and/or anti-block may aid in controlling friction and/or adhesion of adjacent film surfaces.

Generally, the polymers described for use in the multilayer films are described in terms of melt flow index (MFI). In most embodiments, the MFI of polymers for use in the multilayer film are from about 0.1 to about 20.0 grams per ten minutes (g/10 min), as measured by American Society for Testing Materials (ASTM) D1238 (at 190° C. and 2.16 kg). In some embodiments, the MFI may be from about 0.3 to about 4.0 g/10 min. In some embodiments, the bulk layers of the multilayer film can have different MFI than the scission layer(s).

Bulk Layer Polymers

In some embodiments, the bulk layer may be comprised of polyethylene or a combination of polyethylene and one or more other polymers. The bulk layer polymer may be selected from various thermoplastics used in creating film and having suitable crosslinkability characteristics, for example, polyethylenes. Polyethylenes include, without limitation, high density polyethylene (HDPE), medium density polyethylene (MDPE), low density polyethylene (LDPE), linear low density polyethylene (LLDPE), very low density polyethylene (VLDPE) and ultra-low density polyethylene (ULDPE) and ultra-high molecular weight polyethylene (UHMWPE). Other suitable thermoplastics include fluoropolymers, ethylene copolymers, nylon, polybutylene terephthalate, chlorinated polyethylene, polyacrylates, and polyvinyl chloride.

In some embodiments, the bulk layer polymer may comprise a combination of one or more thermoplastics. The bulk layer polymer may also be comprised of an elastomer, for example rubber (including natural, synthetic, silicone, and/ or nitrile rubber), chlorosulfonated polyethylene, thermoplastic elastomers, polyurethane, polybutadiene, ethylene propylene diene monomer, ethylene propylene rubber, styrene butadiene rubber, and combinations thereof. In some embodiments, the bulk layer polymer is a combination of one or more thermoplastic, elastomer, and combinations thereof. In some embodiments the one or more bulk layer polymers may include ionomers and other modifiers, for example maleic anhydride.

Ethylene polymers may be used in the disclosed multilayer film. In many cases the ethylene polymer may be a polyolefin made from copolymerization of ethylene and another olefin monomer, for example an alpha-olefin. Where the first polymer comprises polyethylene, the polyethylene may comprise one or more of linear low density polyethylene (LLDPE), high density polyethylene (HDPE), medium density polyethylene (MDPE), and low density polyethylene (LDPE). In most cases, LLDPE, HDPE, MDPE, and LDPE have an MFI between about 0.2 to about 10 g/10 min. In some embodiments, the polyethylene may also include one or more additives, selected from anti-block (from about 100 ppm to about 10,000 ppm) or slip aids (from about 100 ppm to about 10,000 ppm). Some exemplary anti-blocks are described in Table 1, below, and at www.ampacet.com/faqs/reasons-for-using-antiblock-additives. Some exemplary slip agents for use in the one or more of the presently disclosed embodiment include long-chain, fatty acid amides, with amides from oleyl (single unsaturated C-18) through erucyl (C-22 single unsaturated) being utilized. Slip agents are effective because of their natural tendency to "bloom" to the surface of the film after extrusion.

TABLE 1

| Commercially Important Inorganic Antiblocks | |
|---|---|
| Type | Chemical Description |
| Natural Silica (DE) | Silicon Dioxide ($SiO_2$) - Mined |
| Talc | Magnesium Silicate - Mined |
| Synthetic Silica | Silicon Dioxide - Manufactured |
| Calcium Carbonate | Calcium Carbonate ($CaCO3$) - Mined |
| Ceramic Spheres | Alumina-silicate ceramic - Manufactured |

TABLE 1-continued

| Commercially Important Inorganic Antiblocks | |
|---|---|
| Type | Chemical Description |
| Kaolin/Clay | Aluminum Silicate - Mined |
| Mica | Aluminum Potassium Silicate - Mined |

Scission Layer Polymers

The scission layer polymer is selected from one or more polymers that may be cleaved by irradiation. In some embodiments, the polymer is selected from Polypropylene (homopolymer or copolymer with ethylene), polytetrafluoroethylene (PTFE), polyacetals (Delrin, Celcon), polymethylpentene, and combinations thereof. In some embodiments, the scission layer polymer may comprise at least one polymer (a scissible polymer) that may be cleaved by irradiation and another polymer that may not cleave upon irradiation. In many embodiments, the scissible polymer of the scission layer comprises greater than about 50% of the polymer of the scissible layer.

A micro- or scission-layer may comprise one or more sublayers. Thus, one or more micro or scission layers (for example, 2, 3, 4, 5, or more scission layers) may be positioned between two bulk layers. In some embodiments, the structure surrounding a single micro-layer may be B/s/B, B/s/s/B, or B/s/s/s/B.

Extrusion Methods

A multilayer film of enhanced tear strength may be made by blown or cast methods. In one embodiment of a blown film a double bubble blown film process is used. This embodiment employs a multilayer die, and at least two different extruders to feed the die. The first and second polymers are melted and fed to a die from the separate extruders.

In the double bubble blown film processes, the multilayer film structure is formed inside an annular die then the film tube is cooled (using air, water or a cold mandrel) to around room temperature after it exists the die. This tube is subsequently heated to a higher temperature (close to but below the melting point of the main polymer) to blow the $2^{nd}$ bubble. As a result of this $2^{nd}$ bubble process, the film is biaxial oriented in machine and transverse direction. The stress on the polymer is frozen in place by the bubble cooling process which causes the final film product to shrink when heated. The disclosed multilayer film can also be made by a cast film extrusion process using a multilayer die. In some embodiments, the multilayer film is created using a layer multiplier method and a single layer die (either flat or annular shape).

The disclosed multilayer shrink film may comprise various combinations of alternating bulk and scission layers. In many embodiments, there may be one scission layer positioned between two bulk layers: B/s/B. As disclosed above, the individual bulk and/or scission layers may comprise two or more sublayers, for example B/B/s/s/B/B, B/s/s/B; B/B/s/B/B, B/s/B/s/B, BB/s/B/s/B/B, B/s/s/BB/s/s/B, etc. The number of alternating layers may be 3, 5, 7, 9, 11, or more, and these layers may include two or more sublayers.

Irradiation

After extrusion the multilayer shrink film is exposed to radiation treatment. The ebeam irradiation can also be applied immediately after the first bubble before the biaxial orientation step of the second bubble. The radiation may be electron beam irradiation (e-beam or ebeam). Irradiation may help to achieve the desired properties for final application of the multilayer shrink film. In most cases, electron irradiation may create free radicals that may, in turn, chemically react in various ways with the polymers. For example, the free radicals can recombine forming crosslinks within or between polymer molecules and increasing the average molecular mass of the polymer. The degree of crosslinking depends upon the polymer and radiation dose, which can be controlled. Additives and radiation type may also affect crosslinking. Irradiation may also result in breakage of polymer chains and a resulting decrease in average molecular mass. Scissioning and crosslinking occur at the same time where one may predominate over the other, depending upon the polymer and the dose of irradiation. In some embodiments, the irradiation source is gamma irradiation (e.g. as disclosed at www.sterigenics.com/crosslinking/crosslinking.htm). Gamma irradiation is a form of pure energy characterized by its deep penetration and low dose rates. Gamma irradiators are powered by Cobalt-60, effectively killing microorganisms throughout the product and its packaging with very little temperature effect and no residues. The amount of radiation received depends on the type of product and its dose requirements.

The disclosed multilayer film may be irradiated with from about 1 Mega rads (Mrds) to about 8 Mrds. In many cases, the level of irradiation is determined by desired physical properties of the final product or application. In most cases, the multilayer film will receive from about 1.5 to about 4.0 Mrds. In one embodiment, the multilayer film receives about 7.6 Mrd.

EXAMPLES

The disclosed multilayer shrink film displays surprisingly enhanced strength after it has been irradiated. The strength of the following films was assayed by analyzing the tear strength of the film in both the machine direction (MD) and transverse direction (TD). As described below, the largest change in tear strength was identified after irradiating the films. Tear strength may be determined by ASTM method D1922. This ASTM test method is used to determine the average force needed to propagate tearing through a specified length of plastic film or non-rigid sheeting after the tear has been started, using an Elmendorf-type tearing tester. Tensile strength is measure by ASTM method D882. This ASTM test method is used to determine the properties (i.e. stiffness, toughness, tensile strength, tensile modulus of elasticity) of plastics in the form of thin sheeting and films (less than 1.0 mm (0.04 in.) in thickness).

Puncture resistance is measure using ASTM D3420. The energy necessary to burst and penetrate the center of a specimen, mounted between two plates with a circular aperture, is measured by the loss in mechanical work-capacity due to the expenditure of kinetic energy by a pendulum, the rounded probe of which passes through the test specimen.

Example 1—Tear Strength of Un-Irradiated Multilayer Shrink Film

Two different films were created for this test. A first film, the Control Film, was manufactured with seven layers of LLDPE, MDPE, LDPE and additive master batch blend in the ratio of about 11:2:5:1 respectively ("Polymer 1"). LLDPE is a linear density polyethylene such as Nova 120A, Westlake LT74104, Westlake SC74580, Westlake SC74859, Dow 2045G and Dow 2065G. MDPE is a medium density polyethylene such as Total M2410, Dow 2038 and Exxon 35-05HH. LDPE is a low density polyethylene such as Dow 503A, Equistar NA345-196, Westlake EB171. The additive master batch contains slip (Crodamide ER from Corda Inc.) and antiblock (HC1400 from Unimin Corporation) and process aid in a 20 MFI LDPE. The Control Film includes four bulk layers, each comprising about 23.5% of the total thickness of the film, and three thinner layers comprising about 2%, each, of the total thickness of the film. All 7 layers were fed from the same polymer blend "Polymer 1". Each bulk layer equaled about 23.5% of the total weight of the film, and each thinner layer equaled about 2% of the total weight of the film. The layers were: about 23.5%/about 2%/about 23.5%/about 2%/about 23.5%/about 2%/about 23.5%. The total thickness of the film was about 0.75 mil.

A second multilayer film, the Invention Film, was constructed similarly to the Control film, and from the same extrusion setup. However, the smaller, non-bulk layers of about 2% each, were made up of a scission polymer, Polymer 2. Thus, the inventive film comprised, in total about 94% Polymer 1 in four bulk layers (of about 23.5% wt each) and about 6% Polymer 2 in three scission-layers (of about 2% wt each). Polymer 2 is a blend of Polypropylene—Polyethylene copolymer (PP-PE) and a small amount of process aid (about 0.5 wt %) in master batch form. PP-PE is a polypropylene-polyethylene copolymer such as Total 8473. The same extrusion process and machines were used for creating both films.

The comparative tear strengths of the films was measured using an Elmendorf ProTear Tester available from Thwing-Albert Instrument Company, Philadelphia, Pa. The test consisted of: 1) preparing ten representative samples of each film; 2) clamping a test specimen in the TAIR clamps of the tester; 3) slitting the film with a razor blade to initiate a slit; 4) releasing the pendulum of the tester which exerts a force on the opposing sides of the slit; and 5) recording the digital readout values of the tester. The digital readout value is the amount of force required to tear the film and it is measured in gram force (gf).

Both films were tested for tear strength prior to irradiation. As depicted in FIG. 1A, the two films had similar MD and TD tear strengths (MD=Machine Direction. TD=Transverse direction). Specifically, the Control Film displayed an MD of about 23±3 gf and a TD of about 19±2 gf, while the Invention Film displayed an MD of about 23±3.5 gf and a TD of about 15±4 gf.

Example 2—Tear Strength of Multilayer Shrink Film after Irradiation

Both films were also irradiated with 2.5 Mrad and tested for tear strength. The continuous film eBeam irradiation unit used was manufactured by RPC industries. It is from their Broadbeam® Electron Processor series. The film sample was processed at about 1000 ft./min. at the desired irradiation level.

Figure 2A:
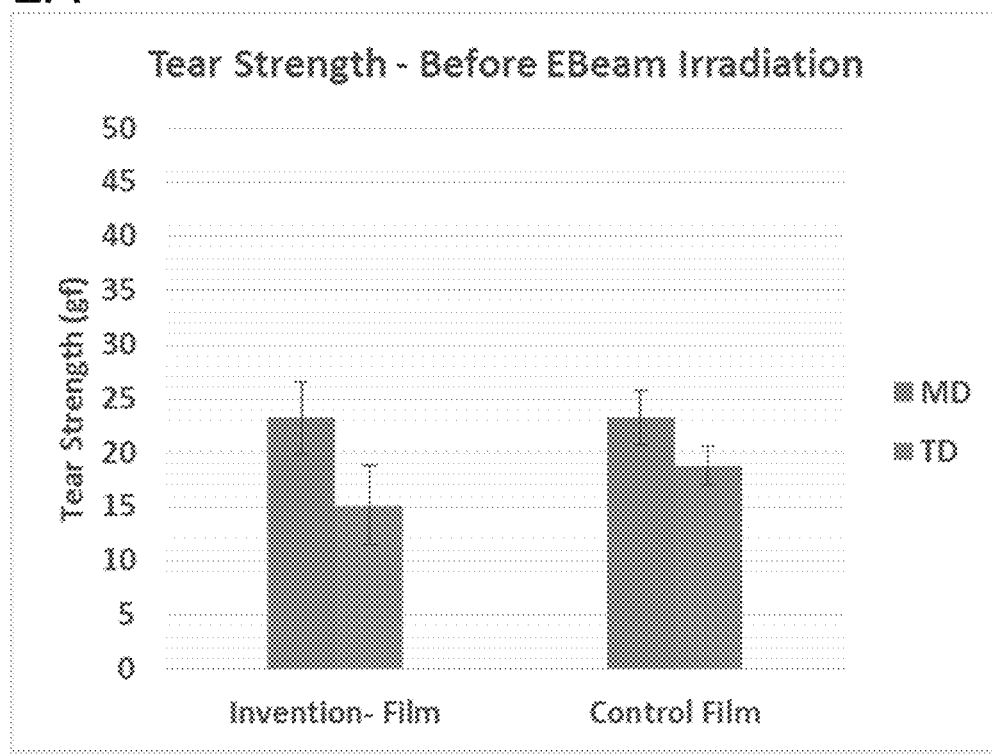
Figure 2B:
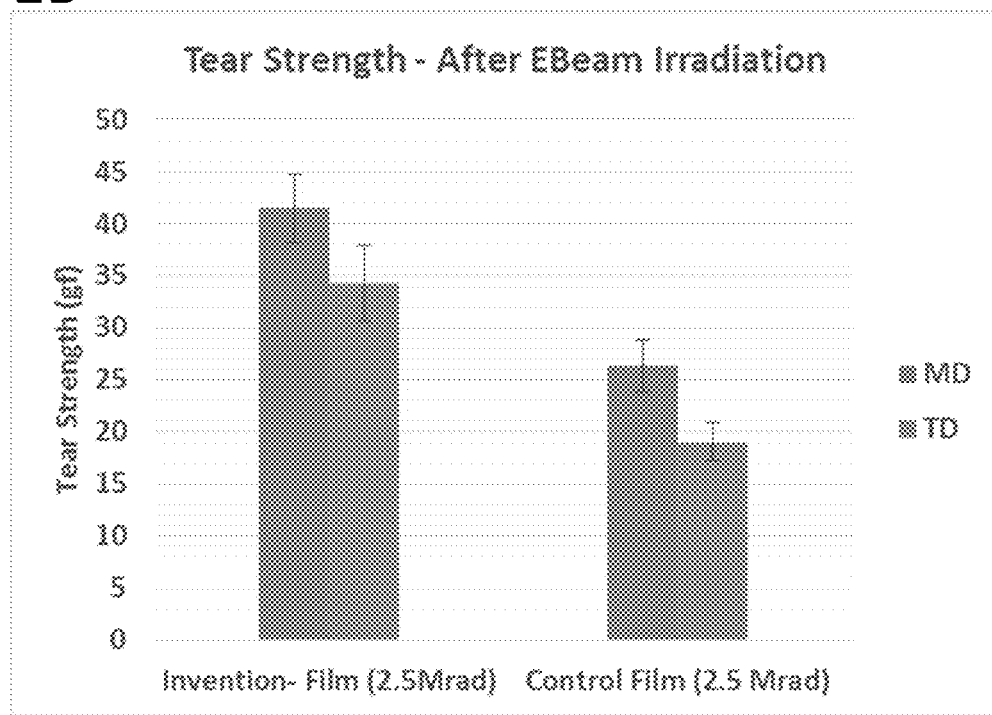

As depicted in FIG. 2B, irradiation did not significantly change the tear strength of the Control Film. Specifically, the Control Film displayed an MD of about 26±3 gf and a TD of about 19±2 gf. This represented about 8% gain in tear strength after irradiation.

In contrast, the Invention Film displayed increased MD and TD. Specifically, after irradiation, the Invention Film displayed an MD of about 41.5 gf±3.5 and a TD of about 34 gf±4. This represents about a two-fold increase in tear strength after irradiation (41.5÷23=1.8; 34÷15=2.3). The Invention film displayed about a 97% gain in tear strength after irradiation, and about a 67% gain over the tear strength of the irradiated Control Film.

Example 3—Tear Strength of Shrink Film with Blended Layers of Polymer 1 and Polymer 2

Two more monolayer films were constructed in order to demonstrate the effectiveness of the invented film structure. Neither film possessed alternating layers of differing polymer. Rather, the first film was constructed of a blended polymer consisting of Polymer 1 and Polymer 2 (at about 94% and about 6%, respectively), the "Blended Monolayer Film." This is the overall composition as the Control Film, described above, but without the multi-layer structure. The film, the "Monolayer Control Film," was constructed of 100% Polymer 1. The total thickness of these film was about 0.6 mil.

Figure 3:
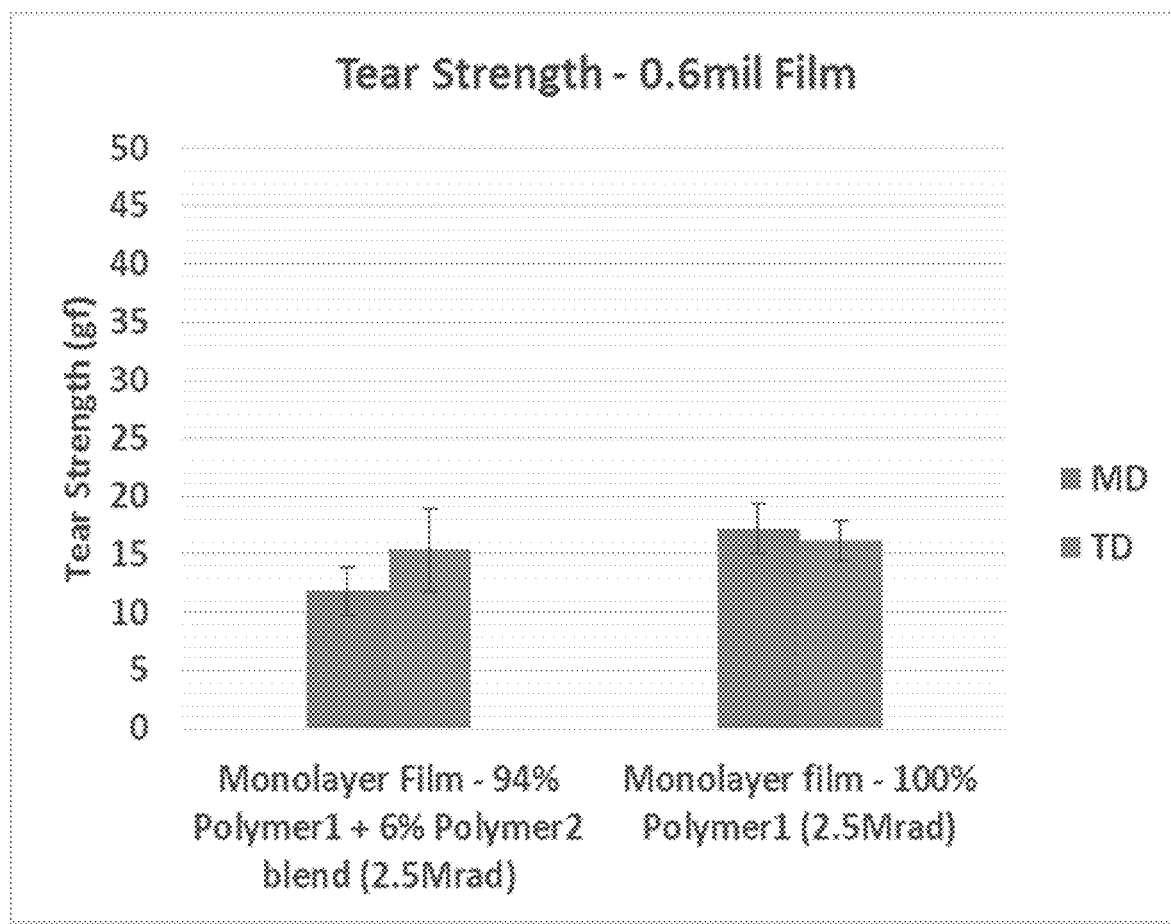
FIG. 3 shows the tear strength of a monolayer polyethylene film.

Here again, both films were irradiated with 2.5 Mrad and tested for tear strength in both the MD and TD. The results are shown in FIG. 3. Specifically, the Blended Monolayer Film displayed an MD of about 12 gf±2 and a TD of about 15 gf±4, while the Monolayer Control Film displayed an MD of about 17 gf±2 and a TD of about 16 gf±2. The Blended Monolayer Film did not exhibit enhanced tear strength as compared to the monolayer control film.

These results indicate that Polymer 2, when provided in a micro or scission layer, results in increased tear strength after irradiation, but not when the polymer is blended with the cross-linkable polymer.

All references disclosed herein, whether patent or non-patent, are hereby incorporated by reference as if each was included at its citation, in its entirety.

Although the present disclosure has been described with a certain degree of particularity, it is understood the disclosure has been made by way of example, and changes in detail or structure may be made without departing from the spirit of the disclosure as defined in the appended claims.

We claim:

1. A three-layer, heat-shrinkable film, comprising:
   two bulk layers comprising one or more cross-linkable polymers that increase in average molecular weight when exposed to irradiation, wherein a first bulk layer is positioned at a first outer surface of the film and a second bulk layer is positioned at a second outer surface of the film, and wherein the two bulk layers have approximately equal thicknesses; and
   one scission layer positioned between the bulk layers, wherein the scission layer comprises a polymer that is cleaved when exposed to irradiation, and the scission layer has a thickness between about 0.5% and 3% of a total thickness of the three-layer film, wherein at least about 50% by weight of the scission layer polymer is selected from one or more of polytetrafluoroethylene, polyacetals, and polymethylpentene.

2. The three-layer film of claim 1, wherein the total thickness of the three-layer film ranges from about 0.3 to about 4.0 mil.

3. The three-layer film of claim 1, wherein the one or more cross-linkable polymers are selected from one or more of polyethylene, polyethylene/alpha-olefin copolymer, ethylene/vinyl acetate copolymer, polyamide, polyacrylate, polyvinyl chloride, chlorinated polyethylene.

4. The three-layer film of claim 1, wherein a three-layer film of about 0.75 mil has a tear value, as measured by the method of ASTM D1922, of at least about 15 grams, as measured in machine or transverse direction, after electron beam irradiation at about 2.5 Mrd.

5. The three-layer film of claim 1, wherein each of the bulk layers comprises linear low density polyethylene, medium density polyethylene, and low density polyethylene.

6. The three-layer film of claim 5, wherein the linear low density polyethylene, medium density polyethylene, and low density polyethylene of the bulk layer are in the ratio of about 11:2:5, respectively.

7. The three-layer film of claim 1, wherein the one or more cross-linkable polymers are selected from one or more of high density polyethylene and medium density polyethylene.

8. A method of enhancing tear strength of a film comprising:
   creating a three-layer film comprising two bulk layers and one scission layer positioned between the two bulk layers, wherein the bulk layers comprise a first polymer that increases in average molecular weight when exposed to irradiation, and the scission layer comprises a second polymer, and wherein the scission layer has a thickness between about 0.5% and 3% of a total thickness of the film, and wherein a first bulk layer is positioned at a first outer surface of the film and a second bulk layer is positioned at a second outer surface of the film, wherein the two bulk layers have approximately equal thicknesses, and wherein at least about 50% by weight of the second polymer is selected from one or more of polytetrafluoroethylene, polyacetals, and polymethylpentene; and
   exposing the film to a radiation source.

9. The method of claim 8, wherein the radiation source is an electron beam.

10. The method of claim 9, wherein the film is exposed to between about 1 Mrds to about 4 Mrds of radiation.

11. A method of using a three-layer heat shrinkable film comprising:
   wrapping a product with the three-layer heat shrinkable film, wherein the film comprises two bulk layers and one scission layer that has been exposed to irradiation, wherein the scission layer has a thickness between about 0.5% and 3% of a total thickness of the multi-layer three-layer heat shrinkable film, wherein a first bulk layer is positioned at a first outer surface of the film and a second bulk layer is positioned at a second outer surface of the film, wherein the two bulk layers have approximately equal thicknesses, wherein each of the bulk layers comprises one or more cross-linkable polymers that increase in average molecular weight when exposed to irradiation, and wherein at least about 50% by weight of the scission layer comprises a polymer selected from one or more of polytetrafluoroethylene, polyacetals, and polymethylpentene;
   exposing the wrapped product to heat; and
   allowing the film to shrink around the product.

12. The method of claim 11, wherein the irradiation is electron beam irradiation.

* * * * *